(12) United States Patent
Magnus et al.

(10) Patent No.: US 10,370,022 B2
(45) Date of Patent: Aug. 6, 2019

(54) STEERING COLUMN ASSEMBLY FOR AUTONOMOUS VEHICLE

(71) Applicant: STEERING SOLUTIONS IP HOLDING CORPORATION, Saginaw, MI (US)

(72) Inventors: Brian J. Magnus, Frankenmuth, MI (US); John S. Beam, Freeland, MI (US)

(73) Assignee: Steering Solutions IP Holding Corporation, Saginaw, MI (US)

(*) Notice: Subject to any disclaimer, the term of this patent is extended or adjusted under 35 U.S.C. 154(b) by 0 days.

(21) Appl. No.: 15/431,034

(22) Filed: Feb. 13, 2017

(65) Prior Publication Data

US 2018/0229753 A1    Aug. 16, 2018

(51) Int. Cl.
  *B62D 1/16*    (2006.01)
  *B62D 1/10*    (2006.01)
  *F16D 1/00*    (2006.01)

(52) U.S. Cl.
  CPC .............. *B62D 1/16* (2013.01); *B62D 1/10* (2013.01); *F16D 1/00* (2013.01)

(58) Field of Classification Search
  CPC .......... B62D 1/16; B62D 1/184; B62D 1/183; B62D 1/181; G05D 1/0061
  See application file for complete search history.

(56) References Cited

U.S. PATENT DOCUMENTS

| | | | |
|---|---|---|---|
| 1,795,567 A | 3/1931 | Maurice | |
| 3,369,425 A | 2/1968 | Runkle et al. | |
| 3,386,309 A | 6/1968 | Reed et al. | |
| 3,396,600 A | 8/1968 | Zeigler et al. | |
| 3,782,492 A | 1/1974 | Hollins | |
| 4,138,167 A | 2/1979 | Ernst et al. | |
| 4,315,117 A | 2/1982 | Kokubo et al. | |
| 4,337,967 A | 7/1982 | Yoshida et al. | |
| 4,476,954 A | 10/1984 | Johnson et al. | |
| 4,503,300 A | 3/1985 | Lane, Jr. | |
| 4,503,504 A | 3/1985 | Suzumura et al. | |
| 4,509,386 A | 4/1985 | Kimberlin | |
| 4,535,645 A | 8/1985 | De Bisschop et al. | |
| 4,559,816 A | 12/1985 | Ebert et al. | |
| 4,561,323 A | 12/1985 | Stromberg | |

(Continued)

FOREIGN PATENT DOCUMENTS

| CN | 1550395 A | 12/2004 |
|---|---|---|
| CN | 1722030 | 1/2006 |

(Continued)

OTHER PUBLICATIONS

English translation regarding DE102015216326B4, ThyssenKrupp AG; 21 pgs.

(Continued)

*Primary Examiner* — Drew J Brown

(57) ABSTRACT

A steering column assembly for an autonomous or semi-autonomous vehicle includes a steering wheel. Also included is a steering shaft selectively coupleable to the steering wheel with a plurality of balls, the steering wheel and the steering shaft transitioning between a rotationally coupled condition and a rotationally decoupled condition, the steering wheel in a rotationally stationary position during the decoupled condition.

19 Claims, 4 Drawing Sheets

(56) References Cited

U.S. PATENT DOCUMENTS

| | | |
|---|---|---|
| 4,570,776 A | 2/1986 | Iwashita et al. |
| 4,598,604 A | 7/1986 | Sorsche et al. |
| 4,602,520 A | 7/1986 | Nishikawa et al. |
| 4,633,732 A | 1/1987 | Nishikawa et al. |
| 4,661,752 A | 4/1987 | Nishikawa et al. |
| 4,669,325 A | 6/1987 | Nishikawa |
| 4,691,587 A | 9/1987 | Farrand et al. |
| 4,785,684 A | 11/1988 | Nichikawa et al. |
| 4,811,580 A | 3/1989 | Jang |
| 4,836,566 A | 6/1989 | Birsching |
| 4,881,020 A | 11/1989 | Hida et al. |
| 4,893,518 A | 1/1990 | Matsumoto et al. |
| 4,901,544 A * | 2/1990 | Jang .................. B60R 25/0222 70/218 |
| 4,901,593 A | 2/1990 | Ishikawa |
| 4,921,066 A | 5/1990 | Conley |
| 4,941,679 A | 7/1990 | Baumann et al. |
| 4,943,028 A | 7/1990 | Hoffmann et al. |
| 4,962,570 A | 10/1990 | Hosaka et al. |
| 4,967,618 A | 11/1990 | Matsumoto et al. |
| 4,976,239 A | 12/1990 | Hosaka |
| 5,048,364 A | 9/1991 | Minamoto et al. |
| 5,226,853 A | 7/1993 | Courgeon |
| 5,240,284 A | 8/1993 | Takada et al. |
| 5,295,712 A | 3/1994 | Omura |
| 5,311,432 A | 5/1994 | Momose |
| 5,319,803 A | 6/1994 | Allen |
| 5,428,873 A | 7/1995 | Hitchcock et al. |
| 5,488,555 A | 1/1996 | Asgari et al. |
| 5,590,565 A | 1/1997 | Palfenier et al. |
| 5,606,892 A | 3/1997 | Hedderly |
| 5,613,404 A | 3/1997 | Lykken et al. |
| 5,618,058 A | 4/1997 | Byon |
| 5,668,721 A | 9/1997 | Chandy |
| 5,678,454 A | 10/1997 | Cartwright et al. |
| 5,690,362 A | 11/1997 | Peitsmeier et al. |
| 5,737,971 A | 4/1998 | Riefe et al. |
| 5,765,116 A | 6/1998 | Wilson-Jones et al. |
| 5,813,699 A | 9/1998 | Donner et al. |
| 5,890,397 A | 4/1999 | Stoner et al. |
| 5,893,580 A | 4/1999 | Hoagland et al. |
| 5,911,789 A | 6/1999 | Keipert et al. |
| 5,931,250 A * | 8/1999 | Kagawa .................. B62D 1/28 180/167 |
| 5,941,130 A | 8/1999 | Olgren et al. |
| 6,041,677 A * | 3/2000 | Reh .......................... B62D 1/10 439/164 |
| 6,070,686 A | 6/2000 | Pollmann |
| 6,079,513 A | 6/2000 | Nishizaki et al. |
| 6,142,523 A | 11/2000 | Bathis |
| 6,170,862 B1 | 1/2001 | Hoagland et al. |
| 6,220,630 B1 | 4/2001 | Sundholm et al. |
| 6,227,571 B1 | 5/2001 | Sheng et al. |
| 6,234,040 B1 | 5/2001 | Weber et al. |
| 6,277,571 B1 | 5/2001 | Sheng et al. |
| 6,264,239 B1 | 7/2001 | Link |
| 6,301,534 B1 | 10/2001 | McDermott, Jr. et al. |
| 6,343,993 B1 | 2/2002 | Duval et al. |
| 6,354,622 B1 | 3/2002 | Ulbrich et al. |
| 6,354,626 B1 | 3/2002 | Cartwright |
| 6,360,149 B1 | 3/2002 | Kwon et al. |
| 6,373,472 B1 | 4/2002 | Palalau et al. |
| 6,381,526 B1 | 4/2002 | Higashi et al. |
| 6,390,505 B1 | 5/2002 | Wilson |
| 6,460,427 B1 | 10/2002 | Hedderly |
| 6,571,587 B2 | 6/2003 | Dimig et al. |
| 6,578,449 B1 | 6/2003 | Anspaugh et al. |
| 6,611,745 B1 | 8/2003 | Paul |
| 6,612,198 B2 | 9/2003 | Rouleau et al. |
| 6,612,393 B2 | 9/2003 | Bohner et al. |
| 6,819,990 B2 | 11/2004 | Ichinose |
| 7,021,416 B2 | 4/2006 | Kapaan et al. |
| 7,025,380 B2 | 4/2006 | Arihara |
| 7,048,305 B2 | 5/2006 | Muller |
| 7,062,365 B1 | 6/2006 | Fei |
| 7,140,213 B2 | 11/2006 | Feucht et al. |
| 7,159,904 B2 | 1/2007 | Schafer et al. |
| 7,213,842 B2 | 5/2007 | Uehle et al. |
| 7,258,365 B2 | 8/2007 | Kahlenberg et al. |
| 7,261,014 B2 | 8/2007 | Arihara |
| 7,290,800 B2 | 11/2007 | Schwarzbich et al. |
| 7,295,904 B2 | 11/2007 | Kanevsky et al. |
| 7,308,964 B2 | 12/2007 | Hara et al. |
| 7,410,190 B2 | 8/2008 | Sawada et al. |
| 7,428,944 B2 | 9/2008 | Gerum |
| 7,461,863 B2 | 12/2008 | Muller |
| 7,495,584 B1 | 2/2009 | Sorensen |
| 7,533,594 B2 | 5/2009 | Menjak et al. |
| 7,628,244 B2 | 12/2009 | Chino et al. |
| 7,719,431 B2 | 5/2010 | Bolourchi |
| 7,735,405 B2 | 6/2010 | Parks |
| 7,758,073 B1 | 7/2010 | Chou |
| 7,775,129 B2 | 8/2010 | Oike et al. |
| 7,784,830 B2 | 8/2010 | Ulintz |
| 7,793,980 B2 | 9/2010 | Fong |
| 7,862,079 B2 | 1/2011 | Fukawatase et al. |
| 7,975,569 B2 | 1/2011 | Klos |
| 7,894,951 B2 | 2/2011 | Norris et al. |
| 7,909,361 B2 | 3/2011 | Oblizajek et al. |
| 7,913,803 B2 | 3/2011 | Hidaka |
| 8,002,075 B2 | 8/2011 | Markfort |
| 3,021,235 A1 | 9/2011 | Tinnin et al. |
| 8,011,265 B2 | 9/2011 | Menjak et al. |
| 8,027,767 B2 | 9/2011 | Klein et al. |
| 8,055,409 B2 | 11/2011 | Tsuchiya |
| 8,069,745 B2 | 12/2011 | Strieter et al. |
| 8,079,312 B2 | 12/2011 | Long |
| 8,146,945 B2 | 4/2012 | Born et al. |
| 8,161,839 B2 | 4/2012 | Warashina |
| 8,170,725 B2 | 5/2012 | Chin et al. |
| 8,260,482 B1 | 9/2012 | Szybalski et al. |
| 8,352,110 B1 | 1/2013 | Szybalski et al. |
| 8,466,382 B2 | 6/2013 | Donicke |
| 8,479,605 B2 | 7/2013 | Shavrnoch et al. |
| 8,548,667 B2 | 10/2013 | Kaufmann |
| 8,606,455 B2 | 12/2013 | Boehringer et al. |
| 8,634,980 B1 | 1/2014 | Urmson et al. |
| 8,650,982 B2 | 2/2014 | Matsuno et al. |
| 8,670,891 B1 | 3/2014 | Szybalski et al. |
| 8,695,750 B1 | 4/2014 | Hammond et al. |
| 8,733,201 B2 | 5/2014 | Okano et al. |
| 8,818,608 B2 | 8/2014 | Cullinane et al. |
| 8,825,258 B2 | 9/2014 | Cullinane et al. |
| 8,825,261 B1 | 9/2014 | Szybalski et al. |
| 8,843,268 B2 | 9/2014 | Lathrop et al. |
| 8,874,301 B1 | 10/2014 | Rao et al. |
| 8,880,287 B2 | 11/2014 | Lee et al. |
| 8,881,861 B2 | 11/2014 | Tojo |
| 8,899,623 B2 | 12/2014 | Stadler et al. |
| 8,909,428 B1 | 12/2014 | Lombrozo |
| 8,948,993 B2 | 2/2015 | Schulman et al. |
| 8,950,543 B2 | 2/2015 | Heo et al. |
| 8,955,407 B2 | 2/2015 | Sakuma |
| 8,994,521 B2 | 3/2015 | Gazit |
| 9,002,563 B2 | 4/2015 | Green et al. |
| 9,031,729 B2 | 5/2015 | Lathrop et al. |
| 9,032,835 B2 | 5/2015 | Davies et al. |
| 9,039,041 B2 | 5/2015 | Buzzard et al. |
| 9,045,078 B2 | 6/2015 | Tovar et al. |
| 9,073,574 B2 | 7/2015 | Cuddihy et al. |
| 9,080,895 B2 | 7/2015 | Martin et al. |
| 9,092,093 B2 | 7/2015 | Jubner et al. |
| 9,108,584 B2 | 8/2015 | Rao et al. |
| 9,134,729 B1 | 9/2015 | Szybalski et al. |
| 9,150,200 B2 | 10/2015 | Urhahne |
| 9,150,224 B2 | 10/2015 | Yopp |
| 9,164,619 B2 | 10/2015 | Goodlein |
| 9,174,642 B2 | 11/2015 | Wimmer et al. |
| 9,186,994 B2 | 11/2015 | Okuyama et al. |
| 9,193,375 B2 | 11/2015 | Schramm et al. |
| 9,199,553 B2 | 12/2015 | Cuddihy et al. |
| 9,227,531 B2 | 1/2016 | Cuddihy et al. |
| 9,233,638 B2 | 1/2016 | Lisseman et al. |
| 9,235,111 B2 | 1/2016 | Davidsson et al. |

(56) References Cited

U.S. PATENT DOCUMENTS

| | | |
|---|---|---|
| 9,235,211 B2 | 1/2016 | Davidsson et al. |
| 9,235,987 B2 | 1/2016 | Green et al. |
| 9,238,409 B2 | 1/2016 | Lathrop et al. |
| 9,248,743 B2 | 2/2016 | Enthaler et al. |
| 9,260,130 B2 | 2/2016 | Mizuno |
| 9,290,174 B1 | 3/2016 | Zagorski |
| 9,290,201 B1 | 3/2016 | Lombrozo |
| 9,296,410 B2 | 3/2016 | Isogai et al. |
| 9,298,184 B2 | 3/2016 | Bartels et al. |
| 9,308,857 B2 | 4/2016 | Lisseman et al. |
| 9,308,891 B2 | 4/2016 | Cudak et al. |
| 9,333,983 B2 | 5/2016 | Lathrop et al. |
| 9,352,752 B2 | 5/2016 | Cullinane et al. |
| 9,360,108 B2 | 6/2016 | Pfenninger et al. |
| 9,360,865 B2 | 6/2016 | Yopp |
| 9,421,994 B2 | 8/2016 | Agbor et al. |
| 9,487,228 B2 | 11/2016 | Febre et al. |
| 9,550,514 B2 | 1/2017 | Schulz et al. |
| 9,616,914 B2 | 4/2017 | Stinebring et al. |
| 9,643,641 B1 | 5/2017 | Stinebring et al. |
| 9,663,136 B2 | 5/2017 | Stinebring et al. |
| 9,744,983 B2 | 8/2017 | Stinebring et al. |
| 9,828,016 B2 | 11/2017 | Lubischer |
| 9,845,106 B2 * | 12/2017 | Bodtker .................. B62D 1/16 |
| 9,849,904 B2 | 12/2017 | Rouleau |
| 9,852,752 B1 | 12/2017 | Chou et al. |
| 9,862,403 B1 | 1/2018 | Rouleau et al. |
| 9,919,724 B2 | 3/2018 | Lubischer et al. |
| 10,131,375 B2 | 11/2018 | Schmidt et al. |
| 2002/0171235 A1 | 11/2002 | Riefe et al. |
| 2003/0046012 A1 | 3/2003 | Yamaguchi |
| 2003/0094330 A1 | 5/2003 | Boloorchi et al. |
| 2003/0146037 A1 | 8/2003 | Menjak et al. |
| 2003/0183440 A1 | 10/2003 | Thomas et al. |
| 2003/0188598 A1 | 10/2003 | Cartwright |
| 2003/0227159 A1 | 12/2003 | Muller |
| 2004/0016588 A1 | 1/2004 | Vitale et al. |
| 2004/0046346 A1 | 3/2004 | Eki et al. |
| 2004/0046379 A1 | 3/2004 | Riefe |
| 2004/0099083 A1 | 5/2004 | Choi et al. |
| 2004/0099468 A1 | 5/2004 | Chernoff et al. |
| 2004/0129098 A1 | 7/2004 | Gayer et al. |
| 2004/0204808 A1 | 10/2004 | Satoh et al. |
| 2004/0262063 A1 | 12/2004 | Kaufmann et al. |
| 2005/0001445 A1 | 1/2005 | Ercolano |
| 2005/0081675 A1 | 4/2005 | Oshita et al. |
| 2005/0197746 A1 | 9/2005 | Pelchen et al. |
| 2005/0242562 A1 | 11/2005 | Ridgway et al. |
| 2005/0263996 A1 | 12/2005 | Manwaring et al. |
| 2005/0275205 A1 | 12/2005 | Ahnafield |
| 2006/0005658 A1 | 1/2006 | Armstrong et al. |
| 2006/0186658 A1 | 8/2006 | Yasuhara et al. |
| 2006/0202463 A1 | 9/2006 | Schwarzbich et al. |
| 2006/0219499 A1 | 10/2006 | Organek |
| 2006/0224287 A1 | 10/2006 | Izawa et al. |
| 2006/0237959 A1 | 10/2006 | Dimig et al. |
| 2006/0244251 A1 | 11/2006 | Muller |
| 2006/0283281 A1 | 12/2006 | Li et al. |
| 2007/0021889 A1 | 1/2007 | Tsuchiya |
| 2007/0029771 A1 | 2/2007 | Haglund et al. |
| 2007/0046003 A1 | 3/2007 | Mori et al. |
| 2007/0046013 A1 | 3/2007 | Bito |
| 2007/0126222 A1 | 6/2007 | Koya et al. |
| 2007/0158116 A1 | 7/2007 | Peppler |
| 2007/0241548 A1 | 10/2007 | Fong |
| 2007/0284867 A1 | 12/2007 | Cymbal et al. |
| 2008/0009986 A1 | 1/2008 | Lu et al. |
| 2008/0028884 A1 | 2/2008 | Monash |
| 2008/0047382 A1 | 2/2008 | Tomaru et al. |
| 2008/0079253 A1 | 4/2008 | Sekii et al. |
| 2008/0147276 A1 | 6/2008 | Pattok et al. |
| 2008/0216597 A1 | 9/2008 | Iwakawa et al. |
| 2008/0238068 A1 | 10/2008 | Kumar et al. |
| 2008/0264196 A1 | 10/2008 | Schindler et al. |
| 2009/0024278 A1 | 1/2009 | Kondo et al. |
| 2009/0056493 A1 | 3/2009 | Dubay et al. |
| 2009/0107284 A1 | 4/2009 | Lucas et al. |
| 2009/0229400 A1 | 9/2009 | Ozsoylu et al. |
| 2009/0256342 A1 | 10/2009 | Cymbal et al. |
| 2009/0266195 A1 | 10/2009 | Tanke et al. |
| 2009/0276111 A1 | 11/2009 | Wang et al. |
| 2009/0280914 A1 | 11/2009 | Kakutani et al. |
| 2009/0292466 A1 | 11/2009 | McCarthy et al. |
| 2010/0152952 A1 | 6/2010 | Lee et al. |
| 2010/0218637 A1 | 9/2010 | Barroso |
| 2010/0222976 A1 | 9/2010 | Haug |
| 2010/0228417 A1 | 9/2010 | Lee et al. |
| 2010/0228438 A1 | 9/2010 | Buerkle |
| 2010/0280713 A1 | 11/2010 | Stahlin et al. |
| 2010/0286869 A1 | 11/2010 | Katch et al. |
| 2010/0288567 A1 | 11/2010 | Bonne |
| 2011/0098922 A1 | 4/2011 | Ibrahim |
| 2011/0153160 A1 | 6/2011 | Hesseling et al. |
| 2011/0167940 A1 | 7/2011 | Shavrnoch et al. |
| 2011/0187518 A1 | 8/2011 | Strumolo et al. |
| 2011/0266396 A1 | 11/2011 | Abildgaard et al. |
| 2011/0282550 A1 | 11/2011 | Tada et al. |
| 2011/0314954 A1 | 12/2011 | Matsuno et al. |
| 2012/0136540 A1 | 5/2012 | Miller |
| 2012/0205183 A1 | 8/2012 | Rombold |
| 2012/0209473 A1 | 8/2012 | Birsching et al. |
| 2012/0215377 A1 | 8/2012 | Takemura et al. |
| 2012/0247259 A1 | 10/2012 | Mizuno et al. |
| 2012/0287050 A1 | 11/2012 | Wu |
| 2013/0002416 A1 | 1/2013 | Gazit |
| 2013/0087006 A1 | 4/2013 | Ohtsubo et al. |
| 2013/0104689 A1 | 5/2013 | Marutani et al. |
| 2013/0133463 A1 | 5/2013 | Moriyama |
| 2013/0158771 A1 | 6/2013 | Kaufmann |
| 2013/0174686 A1 | 7/2013 | Hirche et al. |
| 2013/0199866 A1 | 8/2013 | Yamamoto et al. |
| 2013/0205933 A1 | 8/2013 | Moriyama |
| 2013/0218396 A1 | 8/2013 | Moshchuk et al. |
| 2013/0233117 A1 | 9/2013 | Read et al. |
| 2013/0292955 A1 | 11/2013 | Higgins et al. |
| 2013/0325202 A1 | 12/2013 | Howard et al. |
| 2013/0325264 A1 | 12/2013 | Alcazar et al. |
| 2014/0028008 A1 | 1/2014 | Stadler et al. |
| 2014/0046542 A1 | 2/2014 | Kauffman et al. |
| 2014/0046547 A1 | 2/2014 | Kaufmann et al. |
| 2014/0111324 A1 | 4/2014 | Lisseman et al. |
| 2014/0116187 A1 | 5/2014 | Tinnin |
| 2014/0137694 A1 | 5/2014 | Sugiura |
| 2014/0277896 A1 | 9/2014 | Lathrop et al. |
| 2014/0300479 A1 | 10/2014 | Wolter et al. |
| 2014/0309816 A1 | 10/2014 | Stefan et al. |
| 2015/0002404 A1 | 1/2015 | Hooton |
| 2015/0014086 A1 | 1/2015 | Eisenbarth |
| 2015/0032322 A1 | 1/2015 | Wimmer |
| 2015/0051780 A1 | 2/2015 | Hahne |
| 2015/0060185 A1 | 3/2015 | Feguri |
| 2015/0120142 A1 | 4/2015 | Park et al. |
| 2015/0137492 A1 | 5/2015 | Rao et al. |
| 2015/0203145 A1 | 7/2015 | Sugiura et al. |
| 2015/0203149 A1 | 7/2015 | Katayama et al. |
| 2015/0210273 A1 | 7/2015 | Kaufmann et al. |
| 2015/0246673 A1 | 9/2015 | Tseng et al. |
| 2015/0251666 A1 | 9/2015 | Attard et al. |
| 2015/0283998 A1 | 10/2015 | Lind et al. |
| 2015/0324111 A1 | 11/2015 | Jubner et al. |
| 2015/0375769 A1 | 12/2015 | Abboud et al. |
| 2016/0009332 A1 | 1/2016 | Sirbu |
| 2016/0016604 A1 | 1/2016 | Johta et al. |
| 2016/0075371 A1 | 3/2016 | Varunkikar et al. |
| 2016/0082867 A1 | 3/2016 | Sugioka et al. |
| 2016/0114828 A1 | 4/2016 | Tanaka et al. |
| 2016/0185387 A1 | 6/2016 | Kuoch |
| 2016/0200246 A1 | 7/2016 | Lisseman et al. |
| 2016/0200343 A1 | 7/2016 | Lisseman et al. |
| 2016/0200344 A1 | 7/2016 | Sugioka et al. |
| 2016/0207538 A1 | 7/2016 | Urano et al. |
| 2016/0209841 A1 | 7/2016 | Yamaoka et al. |
| 2016/0229450 A1 | 8/2016 | Basting et al. |
| 2016/0231743 A1 | 8/2016 | Bendewald et al. |

(56) References Cited

U.S. PATENT DOCUMENTS

| | | |
|---|---|---|
| 2016/0244070 A1 | 8/2016 | Bendewald et al. |
| 2016/0244086 A1 | 8/2016 | Moriyama |
| 2016/0252133 A1 | 9/2016 | Caverly |
| 2016/0318540 A1 | 11/2016 | King |
| 2016/0318542 A1 | 11/2016 | Pattok et al. |
| 2016/0347347 A1 | 12/2016 | Lubischer |
| 2016/0347348 A1 | 12/2016 | Lubischer |
| 2016/0362084 A1 | 12/2016 | Martin et al. |
| 2016/0362117 A1 | 12/2016 | Kaufmann et al. |
| 2016/0362126 A1 | 12/2016 | Lubischer |
| 2016/0368522 A1 | 12/2016 | Lubischer et al. |
| 2016/0375770 A1 | 12/2016 | Ryne et al. |
| 2016/0375860 A1 | 12/2016 | Lubischer et al. |
| 2016/0375923 A1 | 12/2016 | Schulz et al. |
| 2016/0375924 A1 | 12/2016 | Bodtker et al. |
| 2016/0375925 A1 | 12/2016 | Lubischer et al. |
| 2016/0375926 A1 | 12/2016 | Lubischer et al. |
| 2016/0375927 A1 | 12/2016 | Schulz |
| 2016/0375928 A1 | 12/2016 | Magnus |
| 2016/0375929 A1 | 12/2016 | Rouleau |
| 2016/0375931 A1 | 12/2016 | Lubischer |
| 2017/0029009 A1 | 2/2017 | Rouleau |
| 2017/0029018 A1 | 2/2017 | Lubischer |
| 2017/0097071 A1 | 4/2017 | Galehr |
| 2017/0106894 A1* | 4/2017 | Bodtker ............... B62D 1/183 |
| 2017/0106895 A1 | 4/2017 | Jager et al. |
| 2017/0113589 A1 | 4/2017 | Riefe |
| 2017/0113712 A1 | 4/2017 | Watz |
| 2017/0151975 A1 | 7/2017 | Schmidt et al. |
| 2017/0294120 A1 | 10/2017 | Ootsuji |
| 2017/0297606 A1 | 10/2017 | Kim et al. |
| 2017/0341677 A1* | 11/2017 | Buzzard ............... B62D 1/183 |
| 2017/0361863 A1* | 12/2017 | Rouleau ............... B62D 1/184 |
| 2017/0369091 A1* | 12/2017 | Nash ................... B62D 1/181 |
| 2018/0029628 A1 | 2/2018 | Sugishita |
| 2018/0029640 A1 | 2/2018 | Otto et al. |
| 2018/0050720 A1* | 2/2018 | King .................... B62D 1/185 |
| 2018/0072339 A1* | 3/2018 | Bodtker ............... B62D 1/183 |
| 2018/0079441 A1 | 3/2018 | McKinzie et al. |
| 2018/0086378 A1 | 3/2018 | Bell et al. |
| 2018/0111639 A1 | 4/2018 | Bodtker et al. |
| 2018/0148084 A1 | 5/2018 | Nash et al. |
| 2018/0154932 A1 | 6/2018 | Rakouth et al. |
| 2018/0238400 A1 | 8/2018 | Magnus et al. |
| 2018/0251147 A1 | 9/2018 | Heitz et al. |
| 2018/0273081 A1 | 9/2018 | Lubischer et al. |

FOREIGN PATENT DOCUMENTS

| | | | |
|---|---|---|---|
| CN | 1736786 | | 2/2006 |
| CN | 101037117 | | 9/2007 |
| CN | 101041355 | | 9/2007 |
| CN | 101291840 A | | 10/2008 |
| CN | 101402320 A | | 4/2009 |
| CN | 101596903 | | 12/2009 |
| CN | 101954862 A | | 1/2011 |
| CN | 102161346 A | | 8/2011 |
| CN | 102452391 | | 5/2012 |
| CN | 102523738 A | | 6/2012 |
| CN | 102574545 A | | 7/2012 |
| CN | 102806937 A | | 12/2012 |
| CN | 103419840 | | 12/2013 |
| CN | 103448785 A | | 12/2013 |
| CN | 103569185 A | | 2/2014 |
| CN | 103587571 A | | 2/2014 |
| CN | 203793405 U | | 8/2014 |
| DE | 19523214 A1 | | 1/1997 |
| DE | 19923012 | | 11/2000 |
| DE | 19954505 A1 * | 5/2001 | ............ B62D 5/001 |
| DE | 10212782 A1 | | 10/2003 |
| DE | 102005032528 | | 1/2007 |
| DE | 102005056438 A1 | | 6/2007 |
| DE | 102006025254 | | 12/2007 |
| DE | 102006025254 A1 | | 12/2007 |
| DE | 1020081057313 A1 | | 10/2009 |
| DE | 102010025197 A1 | | 12/2011 |
| DE | 102015216326 B4 | | 9/2016 |
| EP | 1559630 A2 | | 8/2005 |
| EP | 1783719 | | 5/2007 |
| EP | 1932745 A2 | | 6/2008 |
| EP | 2384946 A2 | | 11/2011 |
| EP | 2426030 A1 | | 3/2012 |
| EP | 2489577 A2 | | 8/2012 |
| EP | 2604487 A1 | | 6/2013 |
| EP | 1606149 B1 | | 5/2014 |
| FR | 2862595 | | 5/2005 |
| FR | 3016327 A1 | | 7/2015 |
| JP | S58191668 A | | 11/1983 |
| JP | S60157963 A | | 8/1985 |
| JP | H05162652 | | 6/1993 |
| JP | 2007253809 A | | 10/2007 |
| JP | 2012201334 A | | 10/2012 |
| KR | 20100063433 A | | 6/2010 |
| KR | 101062339 B1 | | 9/2011 |
| WO | 2006099483 A1 | | 9/2006 |
| WO | 2010082394 A1 | | 7/2010 |
| WO | 2010116518 | | 10/2010 |
| WO | 2014208573 A1 | | 12/2014 |

OTHER PUBLICATIONS

China Patent Application No. 201510204221.5 Second Office Action dated Mar. 10, 2017, 8 pages.
CN Patent Application No. 201210599006.6 First Office Action dated Jan. 27, 2015, 9 pages.
CN Patent Application No. 201210599006.6 Second Office Action dated Aug. 5, 2015, 5 pages.
CN Patent Application No. 201310178012.9 First Office Action dated Apr. 13, 2015, 13 pages.
CN Patent Application No. 201310178012.9 Second Office Action dated Dec. 28, 2015, 11 pages.
CN Patent Application No. 201410089167 First Office Action and Search Report dated Feb. 3, 2016, 9 pages.
EP Application No. 14156903.8 Extended European Search Report, dated Jan. 27, 2015, 10 pages.
EP Application No. 14156903.8 Office Action dated Nov. 16, 2015, 4 pages.
EP Application No. 14156903.8 Office Action dated May 31, 2016, 5 pages.
EP Application No. 14156903.8 Partial European Search Report dated Sep. 23, 2014, 6 pages.
EP Application No. 15152834.6 Extended European Search Report dated Oct. 8, 2015, 7 pages.
European Application No. 12196665.9 Extended European Search Report dated Mar. 6, 2013, 7 pages.
European Search Report for European Application No. 13159950.8; dated Jun. 6, 2013; 7 pages.
European Search Report for related European Application No. 15152834.6, dated Oct. 8, 2015; 7 pages.
Gillespie, Thomas D.; "Fundamentals of Vehicle Dynamics"; Society of Automotive Enginers, Inc.; published 1992; 294 pages.
Kichun, et al.; "Development of Autonomous Car—Part II: A Case Study on the Implementation of an Autonomous Driving System Based on Distributed Architecture"; IEEE Transactions on Industrial Electronics, vol. 62, No. 8, Aug. 2015; 14 pages.
Office Action dated Aug. 29, 2016.
Partial European Search Report for related European Patent Application No. 14156903.8, dated Sep. 23, 2014, 6 pages.
Van Der Jagt, Pim; "Prediction of steering efforts during stationary or slow rolling parking maneuvers"; Jul. 2013, 20 pages.
Varunjikar, Tejas; Design of Horizontal Curves With DownGrades Using Low-Order Vehicle Dynamics Models; A Theisis by T. Varunkikar; 2011; 141 pages.
Chinese Office Action and Search Report for Chinese Application No. 2016103666609.X dated Dec. 20, 2017, 8 pages.
CN Patent Application No. 201510204221.5 Second Office Action dated Mar. 10, 2017, 8 pages.

(56) References Cited

OTHER PUBLICATIONS

English Translation of Chinese Office Action and Search Report for Chinese Application No. 2016103666609.X dated Dec. 20, 2017, 8 pages.
Van der Jagt, Pim; "Prediction of Steering Efforts During Stationary or Slow Rolling Parking Maneuvers"; Ford Forschungszentrum Aachen GmbH.; Oct. 27, 1999; 20 pages.

* cited by examiner

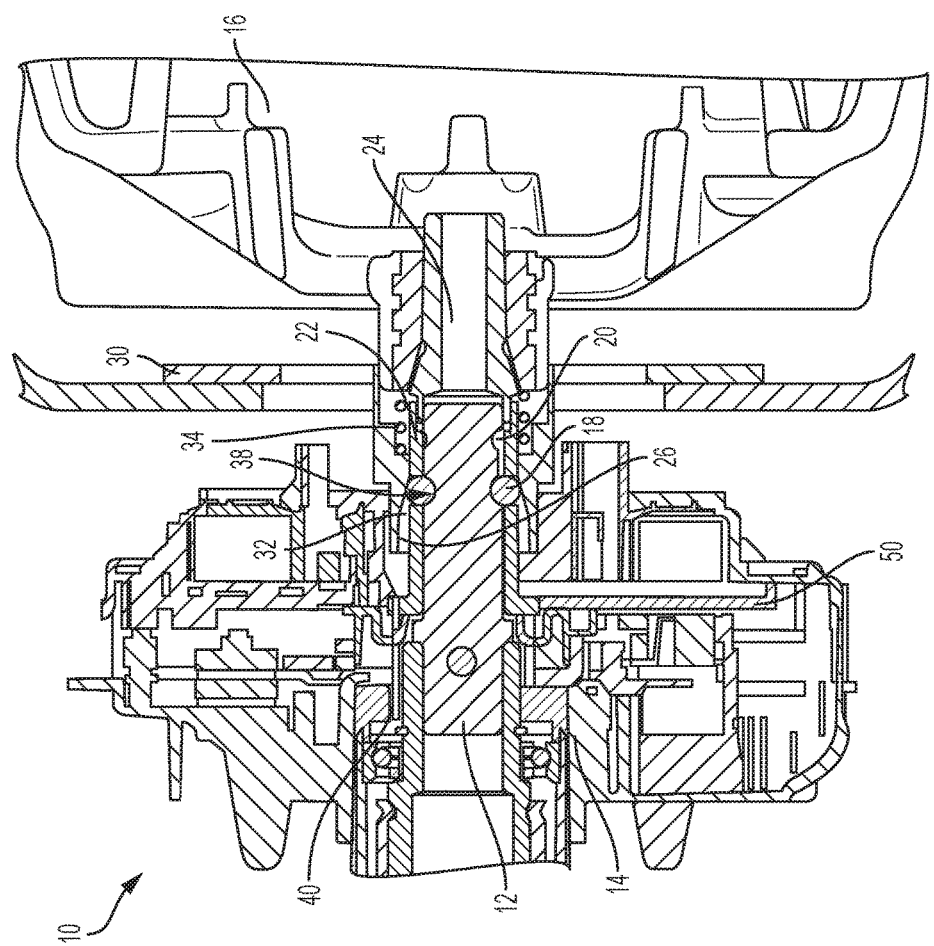

STEERING COLUMN ASSEMBLY FOR AUTONOMOUS VEHICLE

BACKGROUND OF THE INVENTION

The invention described herein relates to steering column assemblies and, more particularly, to steering column assemblies for autonomous vehicles.

As the automotive industry moves toward autonomously driven vehicles, there will be Advanced Driver Assist Systems (ADAS) that allow a vehicle to be autonomously controlled using sensing, steering, and braking technology. Implementing steering on ADAS vehicles may include decoupling the driver interface (e.g., steering wheel) from the steering actuator. However, a rotating driver interface may cause confusion, inconvenience or even harm to the driver during an autonomous driving mode. Addressing the issue of a moving interface will assist with the overall development of autonomous vehicle technology and feasibility.

SUMMARY OF THE INVENTION

According to an aspect of the invention, a steering column assembly for an autonomous or semi-autonomous vehicle includes a steering wheel. Also included is a steering shaft operatively coupled to the steering wheel. The steering shaft includes an annular recess defining a track extending around a circumference of the steering shaft to receive a ball therein. The steering shaft also includes a pocket defined by the steering shaft to receive the ball therein. The steering shaft further includes a track defined by the steering shaft, the track extending from the annular recess to the pocket to transfer the ball therebetween.

According to another aspect of the invention, a steering column assembly for an autonomous or semi-autonomous vehicle includes a steering wheel. Also included is a steering shaft selectively coupleable to the steering wheel with a plurality of balls, the steering wheel and the steering shaft transitioning between a rotationally coupled condition and a rotationally decoupled condition, the steering wheel in a rotationally stationary position during the decoupled condition.

According to yet another aspect of the invention, a steering column assembly for an autonomous or semi-autonomous vehicle includes a steering wheel. Also included is a coupler shaft fixed to the steering wheel, the steering wheel and the coupler shaft rotationally coupled to each other, the coupler shaft having an annular ball cage for retaining a plurality of balls. Further included is a steering shaft coupled to the coupler shaft. The steering shaft includes a first ball retaining structure extending completely around a circumference of the steering shaft. The steering shaft also includes a second ball retaining structure. The steering shaft further includes a track defined by the steering shaft, the track extending from the first ball retaining structure to the second ball retaining structure to transfer the plurality of balls therebetween. A coupler plate is operatively coupled to the steering wheel and has a tube portion surrounding the plurality of balls, an inner wall of the tube portion angled to selectively retain the plurality of balls within the first ball retaining structure or the second ball retaining structure and to selectively transfer the plurality of balls between the first ball retaining structure and the second ball retaining structure.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 4 is a partial cross-sectional view of the steering column assembly in a decoupled condition.

DETAILED DESCRIPTION

Referring now to the Figures, where the invention will be described with reference to specific embodiments, without limiting same, various features of a steering column assembly 10 for an autonomous vehicle are illustrated. As described herein, the embodiments provide a reliable and efficient assembly that allows a driver to decouple a steering wheel from a steering shaft for use of the vehicle in an autonomous mode, while maintaining the steering wheel in a stationary position.

The steering column assembly 10 is part of an autonomous driving assisted steering (ADAS) system that is able to steer as well as control other parameters of the vehicle to operate it without direct driver involvement. Autonomous or semi-autonomous driving refers to vehicles that are configured to perform operations without continuous input from a driver (e.g., steering, accelerating, braking etc.) and may be equipped with technology that allows the vehicle to be autonomously or semi-autonomously controlled using sensing, steering, and/or braking technology. These vehicles are also capable of being driven in a manual mode, as described herein.

Figure 1:
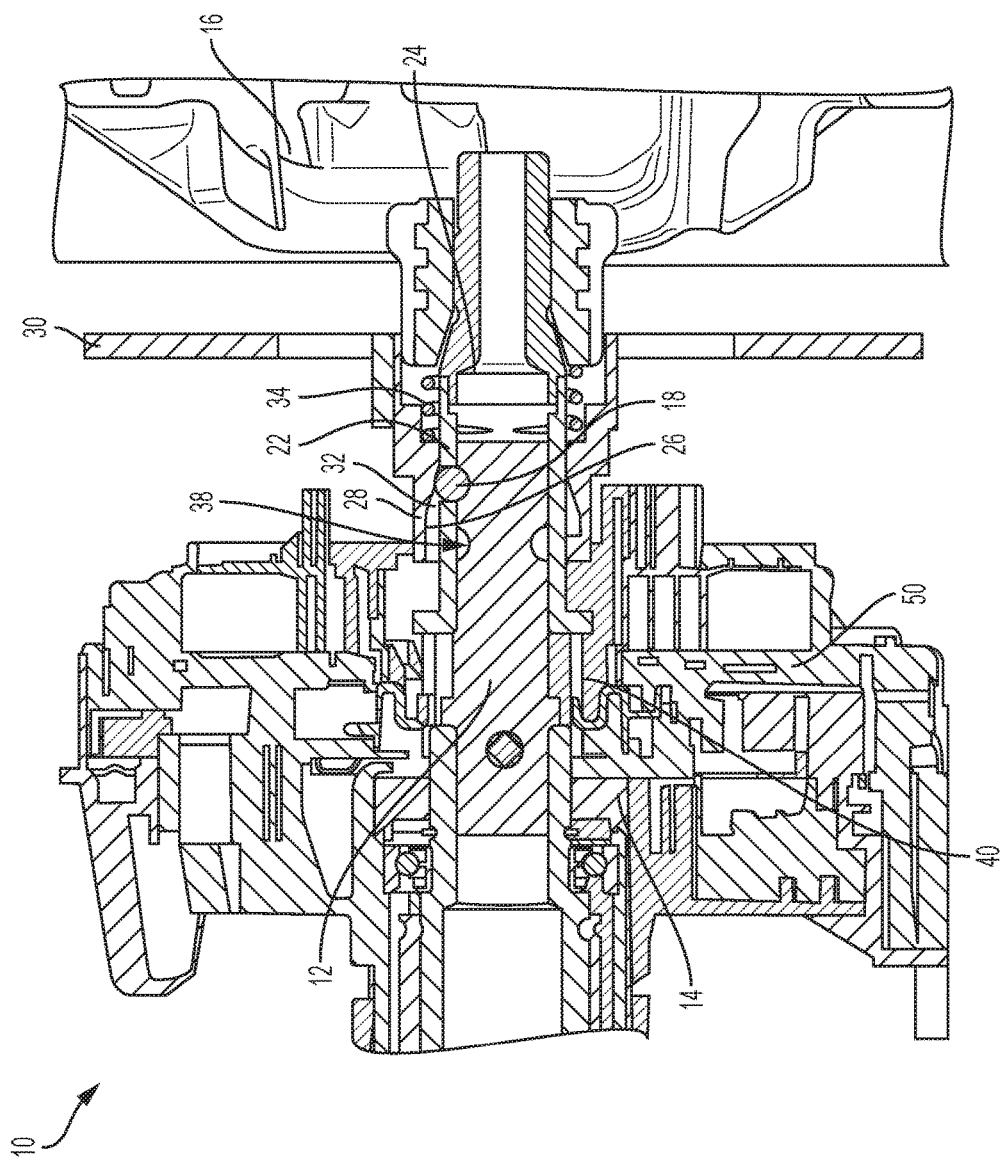
FIG. 1 is a partial cross-sectional view of a steering column assembly in a coupled condition.

Referring to FIG. 1, a portion of the steering column assembly 10 is shown. The steering column assembly 10 includes a steering shaft 12 that is operatively coupled to road wheel control structures (not shown), thereby allowing a driver to input road wheel controls and to receive feedback in response to road wheel movement. A column jacket 14 surrounds a portion of the steering shaft 12. A steering input device, such as the illustrated steering wheel 16, is operatively coupled to the steering shaft 12 to allow the user to control the vehicle in a manual driving mode.

The steering column assembly 10 is shown in the manual driving mode in FIG. 1. In the manual driving mode, the steering wheel 16 is coupled to the steering shaft 12, also referred to as being rotationally coupled. The coupled (or rotationally coupled) condition of the steering wheel 16 and the steering shaft 12 results in common rotation of the steering wheel 16 and the steering shaft 12, such that rotation of the components is dependent upon each other. Conversely, a decoupled condition (FIG. 4) of the steering wheel 16 and the steering shaft 12 may be present during an autonomous driving mode. The decoupled (or rotationally decoupled) condition results in independent rotation of the steering wheel 16 and the steering shaft 12, such that rotation of the steering shaft 12 in response to road wheel angular movement does not require or result in rotation of the steering wheel 16, i.e., a rotationally stationary steering wheel. The steering column assembly 10 disclosed herein provides a driver the ability to switch between the coupled and decoupled condition in conjunction with switching between manual and autonomous driving modes.

Figure 2:
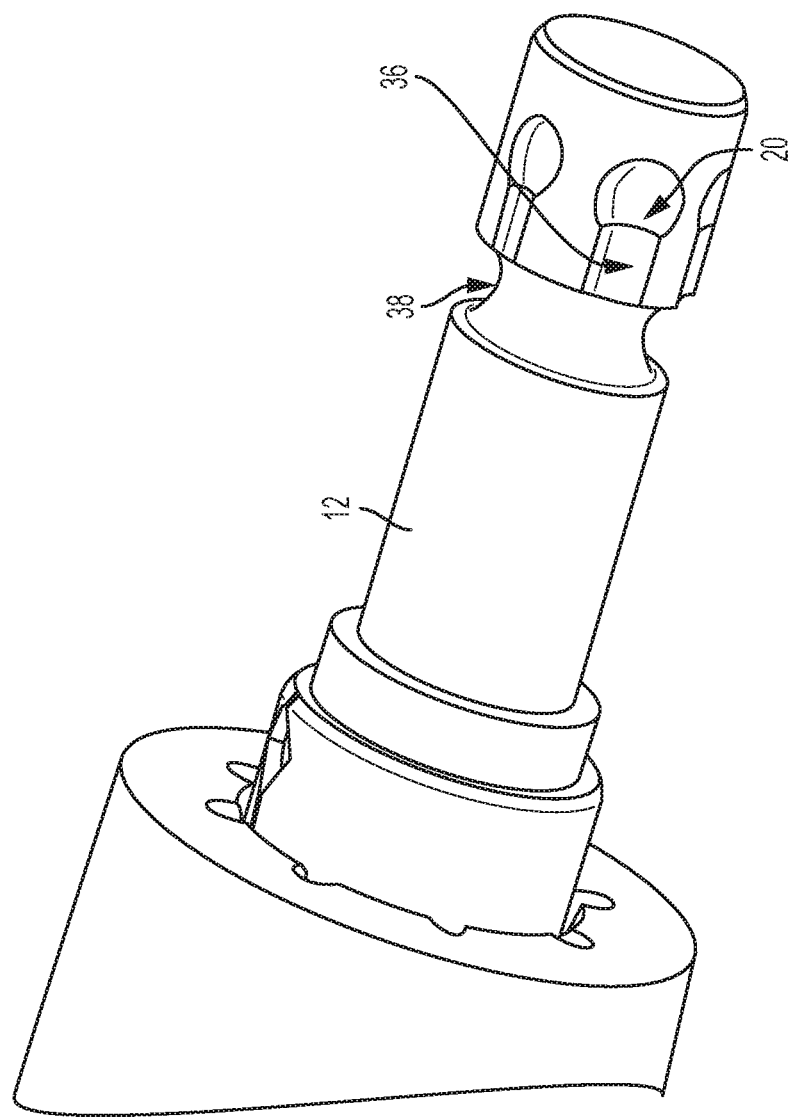
FIG. 2 is a perspective view of a steering shaft of the steering column assembly.

Referring now to FIGS. 1 and 2, various features that facilitate switching between the coupled and decoupled conditions are illustrated. In contrast to a continuously fixed relationship between the steering shaft 12 and the steering wheel 16 that is achieved with a splined mating assembly, the embodiments described herein employ at least one, but typically a plurality of balls 18 to establish the coupled or decoupled conditions. In the coupled condition of FIG. 1, the plurality of balls 18 are fixed within a plurality of respective pockets 20 (also referred to herein as a ball retaining structure) defined by the steering shaft 12 in a one-to-one relationship. The pockets 20 are circumferentially spaced from each other and are each sized to retain one of the balls 18 therein.

The balls 18 are permanently held in a ball cage 22 formed in a coupler shaft 24 that is fixed to the steering wheel 16. In some embodiments, the coupler shaft 24 and the steering wheel 16 are fixed to each other in a splined manner. Irrespective of the precise manner of fixing the coupler shaft 24 and the steering wheel 16, the coupler shaft 24 and the steering wheel 16 are rotationally coupled and rotate together in a dependent manner. Therefore, when the balls 18 are positioned with the pockets 20 of the steering shaft 12, torque transmission between the steering wheel 16 and the steering shaft 12 is established. To retain the balls 18 within the pockets 20 and prevent radial movement of the balls 18, an inner wall 26 of a tube portion 28 of a coupler plate 30 is disposed in contact with the balls 18. More specifically, an innermost location of an angled portion 32 of the inner wall 26 is in contact with the balls 18. The angled portion 32 is angled relative to a longitudinal axis of the overall steering column assembly 10. The coupler plate 30 is secured to the steering wheel 16 and the tube portion 28 extends axially to surround a portion of the steering shaft 12. The inner wall 26 of the tube portion 28 includes a portion that is spaced from the balls 18 to allow the balls 18 to move radially outwardly, as described in detail herein.

A spring 34 biases the coupler plate 30 away from the steering wheel 16 to locate the inner most location of the angled portion 32 into contact with, or in close proximity to, the balls 18 to retain the balls 18 within the pockets 20 in the coupled condition.

As shown best in FIG. 2, the steering shaft 12 includes a plurality of elevated tracks 36 that each extends to a radial depth that is less than a radial depth of the pockets 20. Each of the tracks 36 lead to a respective pocket 20 and to an annular recess 38 that is defined by the steering shaft 12. The annular recess 38 extends completely around the steering shaft 12 (i.e., 360 degrees). As with the pockets, the radial depth of the elevated tracks 36 extends to a radial depth that is less than a radial depth of the annular recess 38. The elevated positioning of the tracks 36 retains the balls 18 in the axial direction, whether positioned in the pockets 20 or the annular recess 38, while the angled portion 32 of the inner wall 26 of the coupled plate 30 retains the balls 18 in a radial direction. While disposed in the pockets 20, the balls 18 are retained in the circumferential direction due to the circumferentially spaced orientation of the pockets 20.

The elevated tracks 36 facilitate transfer of the balls 18 between the pockets 20 and the annular recess 38. As described above, positioning of the balls 18 in the pockets 20 provides the coupled condition (FIG. 1) of the steering column assembly 10. In the decoupled condition shown in FIG. 4, the balls 18 are positioned in the annular recess 38. Because the annular recess 38 extends completely around the steering shaft 12, the balls 18 are free to rotate in an unimpeded manner over a full range of rotation of the steering shaft 12, thereby rotationally decoupling the steering wheel 16 from the steering shaft 12.

In operation, in the manual driving mode (FIG. 1) the coupler plate 30 forces the balls 18 into the pockets 20 on the steering shaft 12 via the angled portion 32 (i.e., inclined surface) of the inner wall 26 and the biasing force of the spring 34. Since the balls 18 are always contained in the ball cage 22 of the coupler shaft 24, the coupled condition allows for torque transfer from the steering wheel 16 through the coupler shaft 24 and balls 18 to the steering shaft 12, and the rest of the steering system. To convert to an autonomous driving mode (FIG. 4), the coupler plate 30 is pulled back by the driver with sufficient force to overcome the biasing force of the spring 34 until the coupler plate 30 stops against the steering wheel 16. This allows for the balls 18 to be forced out of the pockets 20 by the force of the driver pushing on the steering wheel 16. The balls 18 follow the elevated tracks 36 as they transfer to the annular recess 38. At this point, the steering wheel 16 can be pushed no further and the coupler plate 30 is released by the driver. This action forces the balls 18 into the continuous track of the annular recess 38, thereby allowing the balls to continuously travel within the annular recess 38 and around the steering shaft 12 to define the decoupled condition.

Figure 3:
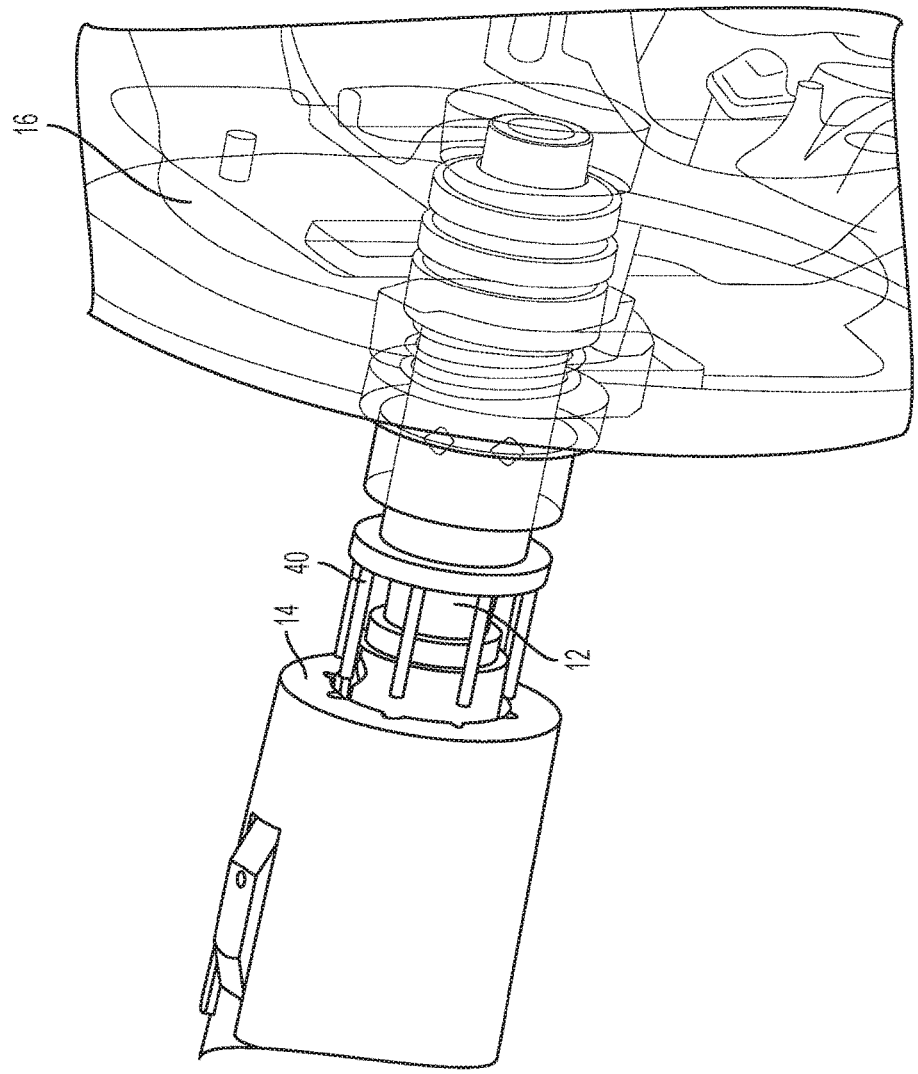
FIG. 3 is a perspective view of a grounding structure of the steering shaft.

Referring to FIGS. 1, 3 and 4, the steering column assembly 10 also facilitates a "quiet wheel" mode for the steering wheel 16 when the assembly in the decoupled condition. A "quiet wheel" mode refers to a rotationally stationary position and condition of the steering wheel 16. Maintaining the steering wheel 16 in a stationary position reduces the likelihood of driver confusion, inconvenience and/or harm.

Placing the steering wheel in the stationary position occurs upon transition to the decoupled condition of the steering column assembly 10 shown in FIG. 4. The coupler plate 30 or steering wheel 16 includes a grounding structure 40 that engages a non-rotating structure of the steering column assembly 10 to rotationally lock the steering wheel 16. In some embodiments, at least one, but possibly a plurality of pins comprises the grounding structure 40, the pins 40 being engageable with receiving holes defined by the column jacket 14, which may be an upper column jacket. The pins 40 may also extend through a portion of a supplemental inflatable restraint (SIR) coil switch housing 50. The preceding example is merely illustrative of how the steering wheel 16 may be locked in the "quiet wheel" mode. Although the steering wheel 16 is rotationally locked, the steering shaft 12 is free to rotate due to the balls 18 being disposed in the annular recess 38.

In some embodiments, the overall steering system is monitored with an absolute position sensor and the system only allows switching between the driving modes (autonomous and manual) when the steering system is in an "on-center position" (e.g., straight ahead driving position). This facilitates a smooth transition between the driving modes.

The embodiments described herein provide a reliable and efficient way to transition between the coupled and decoupled conditions of the steering column assembly 10. Additionally, the steering wheel 16 is desirably maintained in a stationary position (rotationally) while the assembly is in the decoupled condition and autonomous driving mode.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly for an autonomous or semi-autonomous vehicle comprising:
    a steering wheel; and
    a steering shaft operatively coupled to the steering wheel, the steering shaft comprising:
        an annular recess extending around a circumference of the steering shaft to receive a ball therein;
        a pocket defined by the steering shaft to receive the ball therein; and
        a track defined by the steering shaft, the track extending from the annular recess to the pocket to transfer the ball therebetween.

2. The steering column assembly of claim 1, wherein the steering wheel is decoupled from the steering shaft when the ball is disposed in the annular recess to permit independent rotation of the steering shaft and the steering wheel during an autonomous driving mode, the steering wheel coupled to the steering shaft when the ball is disposed in the pocket to provide common rotation of the steering shaft and the steering wheel during a manual driving mode.

3. The steering column assembly of claim 1, further comprising a coupler shaft fixed to the steering wheel, the steering wheel and the coupler shaft rotationally coupled to each other, the coupler shaft having an annular ball cage for retaining the ball in an axial position of the coupler shaft.

4. The steering column assembly of claim 1, further comprising a coupler plate operatively coupled to the steering wheel and having a tube portion surrounding the ball, an inner wall of the tube portion angled to selectively retain the ball within the annular recess or the pocket and to selectively transfer the ball between the annular recess and the pocket.

5. The steering column assembly of claim 4, wherein the coupler plate is axially translatable to translate the inner wall of the tube portion to allow the ball to move radially outwardly and out of the pocket or the annular recess.

6. The steering column assembly of claim 5, wherein the coupler plate includes at least one grounding structure engageable with a non-rotating structure of the steering column assembly to fix the steering wheel in a non-rotational position when the steering wheel is decoupled from the steering shaft.

7. The steering column assembly of claim 6, wherein the at least one grounding structure comprises at least one pin and the non-rotating structure of the steering column assembly is a steering column jacket.

8. The steering column assembly of claim 5, further comprising a spring biasing the coupler plate to an axial position that locates the inner wall to retain the ball within the annular recess or the pocket.

9. The steering column assembly of claim 1, wherein the ball is one of a plurality of balls, each of the balls located within a common axial plane and transferrable between the annular recess and one of a plurality of pockets defined by the steering shaft via one of a plurality of tracks.

10. A steering column assembly for an autonomous or semi-autonomous vehicle comprising:
    a steering wheel;
    a steering shaft selectively coupleable to the steering wheel with a plurality of balls, the steering wheel and the steering shaft transitioning between a rotationally coupled condition and a rotationally decoupled condition, the steering wheel in a rotationally stationary position during the decoupled condition;
    at least one recess extending around a circumference of the steering shaft to receive a ball therein;
    a pocket defined by the steering shaft to receive the ball therein; and
    a track extending between the recess and the pocket.

11. The steering column assembly of claim 10, further comprising a coupler shaft fixed to the steering wheel, the steering wheel and the coupler shaft rotationally coupled to each other, the coupler shaft having an annular ball cage for retaining the ball in an axial position of the coupler shaft.

12. The steering column assembly of claim 10, further comprising a coupler plate operatively coupled to the steering wheel and having a tube portion surrounding the ball, an inner wall of the tube portion angled to selectively retain the ball within the annular recess or the pocket and to selectively transfer the ball between the annular recess and the pocket.

13. The steering column assembly of claim 12, wherein the coupler plate is axially translatable to translate the inner wall of the tube portion to allow the ball to move radially outwardly and out of the pocket or the annular recess.

14. The steering column assembly of claim 13, wherein the coupler plate includes at least one grounding structure engageable with a non-rotating structure of the steering column assembly to fix the steering wheel in a non-rotational position when the steering wheel is decoupled from the steering shaft.

15. A steering column assembly for an autonomous or semi-autonomous vehicle comprising:
    a steering wheel;
    a coupler shaft fixed to the steering wheel, the steering wheel and the coupler shaft rotationally coupled to each other, the coupler shaft having an annular ball cage for retaining a plurality of balls;
    a steering shaft coupled to the coupler shaft, the steering shaft comprising:
        a first ball retaining structure extending completely around a circumference of the steering shaft;
        a second ball retaining structure; and
        a track defined by the steering shaft, the track extending from the first ball retaining structure to the second ball retaining structure to transfer the plurality of balls therebetween; and
    a coupler plate operatively coupled to the steering wheel and having a tube portion surrounding the plurality of balls, an inner wall of the tube portion angled relative to a longitudinal axis of the steering column assembly to selectively retain the plurality of balls within the first ball retaining structure or the second ball retaining structure and to selectively transfer the plurality of balls between the first ball retaining structure and the second ball retaining structure.

16. The steering column assembly of claim 15, wherein the steering wheel is decoupled from the steering shaft when the ball is disposed in the annular recess to permit independent rotation of the steering shaft and the steering wheel during an autonomous driving mode, the steering wheel coupled to the steering shaft when the ball is disposed in the pocket to provide common rotation of the steering shaft and the steering wheel during a manual driving mode.

17. The steering column assembly of claim 16, wherein the coupler plate includes at least one grounding structure engageable with a non-rotating structure of the steering column assembly to fix the steering wheel in a non-rotational position when the steering wheel is decoupled from the steering shaft.

18. The steering column assembly of claim 17, wherein the at least one grounding structure comprises at least one pin and the non-rotating structure of the steering column assembly is a steering column jacket.

19. The steering column assembly of claim 16, further comprising a spring biasing the coupler plate to an axial position that locates the inner wall to retain the ball within the first ball retaining structure or the second ball retaining structure.

* * * * *